(12) United States Patent
Gupta

(10) Patent No.: US 9,016,078 B2
(45) Date of Patent: Apr. 28, 2015

(54) FUEL TANK FLAMMABILITY REDUCTION AND INERTING SYSTEM AND METHODS THEREOF

(75) Inventor: Alankar Gupta, Normandy Park, WA (US)

(73) Assignee: The Boeing Company, Chicago, IL (US)

( * ) Notice: Subject to any disclaimer, the term of this patent is extended or adjusted under 35 U.S.C. 154(b) by 763 days.

(21) Appl. No.: 13/299,001

(22) Filed: Nov. 17, 2011

(65) Prior Publication Data
US 2013/0126193 A1     May 23, 2013

(51) Int. Cl.
*A62C 3/06*     (2006.01)
*B64D 37/32*    (2006.01)
*B64D 13/06*    (2006.01)

(52) U.S. Cl.
CPC ........ *B64D 37/32* (2013.01); *B64D 2013/0677* (2013.01)

(58) Field of Classification Search
CPC ........... B65D 37/32; B65D 2013/0677; B65D 2700/6967
USPC ................... 62/172, 244, 129, 231, 401, 402; 169/45, 56, 66
See application file for complete search history.

(56) References Cited

U.S. PATENT DOCUMENTS

| | | | | |
|---|---|---|---|---|
| 4,378,920 A * | 4/1983 | Runnels et al. | ........... | 244/135 R |
| 6,440,317 B1 * | 8/2002 | Koethe | ........... | 210/774 |
| 6,843,269 B2 * | 1/2005 | Verma et al. | ........... | 137/209 |
| 7,172,157 B2 * | 2/2007 | Jones | ........... | 244/135 R |
| 7,191,983 B2 * | 3/2007 | Loss et al. | ........... | 244/135 R |
| 7,204,868 B2 * | 4/2007 | Snow, Jr. | ........... | 96/4 |
| 7,306,646 B2 * | 12/2007 | Wong | ........... | 95/45 |
| 7,806,966 B2 * | 10/2010 | Bose | ........... | 95/270 |
| 7,918,358 B2 | 4/2011 | Gupta | | |
| 7,955,424 B2 | 6/2011 | Gupta | | |
| 8,015,838 B2 * | 9/2011 | Lippold et al. | ........... | 62/401 |
| 2003/0054307 A1 * | 3/2003 | Gerstendorfer et al. | ........ | 431/117 |
| 2005/0247197 A1 * | 11/2005 | Snow | ........... | 95/138 |
| 2007/0000380 A1 * | 1/2007 | Leigh et al. | ........... | 95/11 |
| 2008/0060523 A1 * | 3/2008 | Tom et al. | ........... | 96/109 |
| 2008/0099618 A1 * | 5/2008 | Zaki et al. | ........... | 244/135 R |
| 2008/0187785 A1 * | 8/2008 | Kwok | ........... | 429/12 |
| 2009/0288724 A1 * | 11/2009 | Bizzarro | ........... | 137/872 |
| 2010/0108692 A1 * | 5/2010 | Gupta | ........... | 220/592.01 |
| 2010/0108811 A1 * | 5/2010 | Gupta | ........... | 244/129.2 |
| 2013/0133348 A1 * | 5/2013 | Squier | ........... | 62/172 |

OTHER PUBLICATIONS

"Method and System for Making a Fuel tank Inert"—SAE Paper No. 2009-01-3134.
Final Rule Federal Register/ vol. 73 No. 140/ Monday Jul. 21, 2008.
EASA Safety Information Bulletin, EASA SIB No. 2010-10: Fuel tank Safety "Flammability Reduction System (FRS) for High Flammability Exposure Fuel Tanks —Production Cut-in" Issued Mar. 31, 2010.

* cited by examiner

*Primary Examiner* — Mohammad M Ali
(74) *Attorney, Agent, or Firm* — Weiss & Moy, P.C.

(57) ABSTRACT

A system for reducing flammability has a heat exchanger that cools ullage from a tank, condenses vapors within the ullage, and returns the cooled ullage and vapors to the tank.

19 Claims, 5 Drawing Sheets

FUEL TANK FLAMMABILITY REDUCTION AND INERTING SYSTEM AND METHODS THEREOF

BACKGROUND

Embodiments of this disclosure generally relate to a fuel tank, and more particularly, to reducing a potential of hazardous conditions within an aircraft fuel tank by cooling ullage in a heat exchanger.

Inerting aircraft fuel tanks may remove potential hazardous situations arising from combustible combinations of oxygen, fuel vapors and ignition sources. Existing solutions for reducing fuel tank flammability may include adulterating ullage within the fuel tank with nitrogen enriched air (NEA) or oxygen depleted air (ODA) that may be generated by an onboard inert gas generating system (OBIGGS), which may be referred to as a nitrogen gas inerting system (NGS) or fuel-tank inerting system (FTIS).

OBIGGS may use compressed air to generate NEA or ODA. OBIGGS may require that the air supplied to it be within a narrow band of pressures and temperatures and that the air be clean, of low humidity and with low ozone and hydrocarbon concentrations.

NEA or ODA may be an asphyxiant, while oxygen enriched air (OEA) may be a potential fire hazard. Hydrocarbon laden gases exhausting from the fuel-tank may be a carcinogenic and also malodorous and unfriendly to the environment. OBIGGS may use a hollow fiber membrane (HFM) in air separation modules (ASM) for generating NEA and OEA. Performance and operation of ASM may be adversely affected by contaminants in the air that they process.

NGS systems may be expensive to develop and certify as they may not be reliably simulated by analysis. They may use substantial auxiliary equipment that is expensive, for example, an ozone converter to dissociate ozone in air, turbocompressor to ensure air pressure within design limits during low pressure conditions, heat-exchangers to cool and heaters to heat to ensure air supply within design temperature limits, filter to reduce particulate contamination, water separator to remove excessive moisture and oxygen sensor to check the ASM performance. In addition multiple sensors and control devices may be used to monitor the performance of components and to protect equipment from component failures.

Therefore, it would be desirable to provide a fuel tank flammability reduction and inerting system and methods that overcome the above problems.

SUMMARY

A system for reducing flammability has a heat exchanger that cools ullage from a tank, condenses vapors within the ullage, and returns the cooled ullage and vapors to the tank.

A fuel inerting system has a heat exchanger. A subsystem element of the system has at least one processor and a memory operatively coupled to the processor. The memory stores program instructions that when executed by the processor causes the processor to determine a fuel-to-air ratio within a tank and cool ullage within the tank in the heat exchanger when the fuel-to-air ratio is above the predetermined threshold.

A method for reducing tank flammability comprising: removing ullage from a tank; cooling the ullage for condensing out fuel vapors within the ullage; and returning the cooled ullage and condensed vapors to the tank.

The features and functions may be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
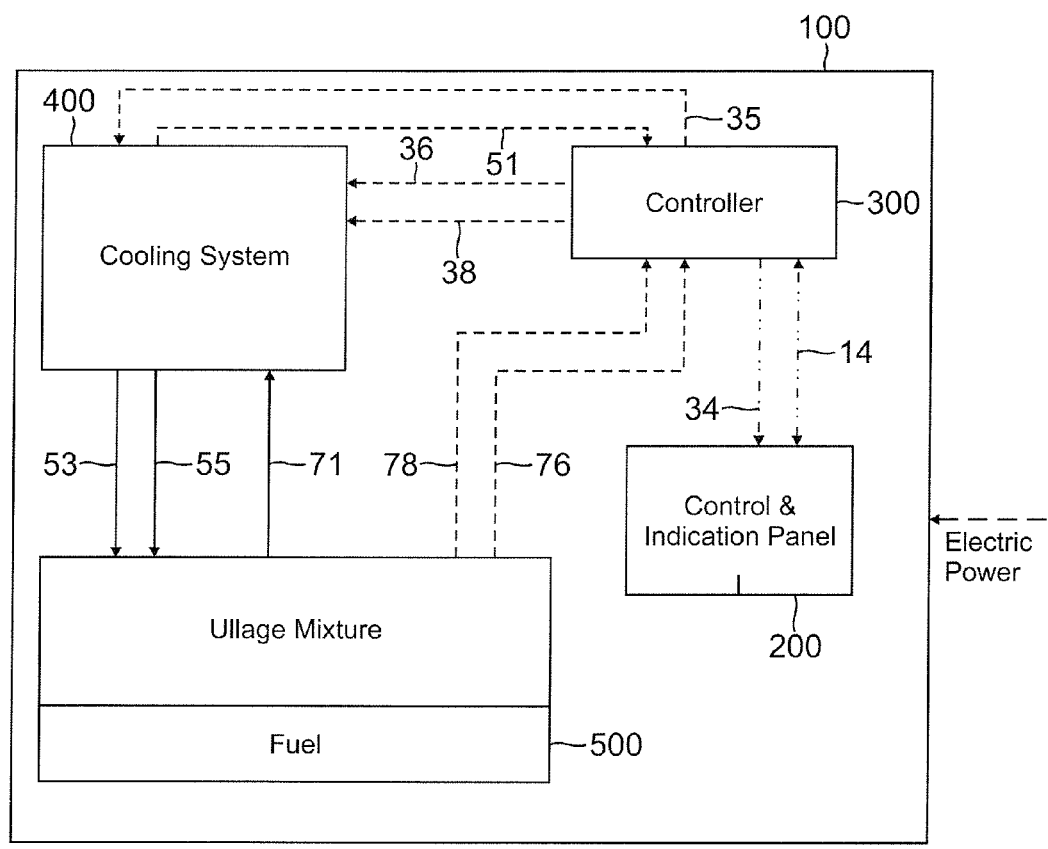
FIG. 1 is an exemplary fuel tank flammability reduction and inerting system.

Referring to FIG. 1, an exemplary fuel tank flammability reduction and inerting system 100 may be provided. The system 100 may include a control and indication panel 200, controller 300, cooling system 400 and fuel tank 500. As will be shown, a number of different signals and instructions may be provided between the components of the system 100. In one embodiment, these signals and instructions may be provided wirelessly. A wireline connection or a combination of both a wireless and wireline connection may be used.

Through the control and indication panel 200 a system selected instruction 14 may be provided to and from the controller 300. An indicator instruction 34 may be provided from the controller 300 to the control and indication panel 200. A turbine bypass valve instruction 35 may be provided from the controller 300 to the cooling system 400. A turbine discharge temperature $T_{TURBINE}$ 51 may be provided by the cooling system 400 to the controller 300. From the controller 300, a stop cooling system instruction 36 may be provided to the cooling system 400. A start cooling system instruction 38 may be provided to the cooling system 400 from the controller 300. The ullage temperature $T_{ULLAGE}$ 78 may be sent to the controller 300 from the fuel tank 500. Fuel tank pressure $P_{FUEL}$ 76 may also be provided from the fuel tank 500 to the controller 300. In the case of a fuel tank 500 vented to outside ambient, $P_{FUEL}$ 76 may y be substituted by the aircraft ambient pressure signal (not shown) from the aircraft data system.

Through those signals and instructions provided above, the cooling system 400 may interact with the fuel tank 500 such that ullage mixture may be withdrawn from the fuel tank 500 through conduit 71 to the cooling system 400. A flame arrestor (not shown) may be included for safety. The ullage mixture may be brought to low temperatures in a heat exchanger 420 within the cooling system 400 thereby condensing out fuel vapors present in the mixture. The condensed fuel vapors, in the form of liquid fuel, may be separated from the cold mixture in the separator 422 and returned to the fuel tank 500 through conduit 55. The cold ullage mixture may also be returned to the fuel tank 500 through conduit 53.

Typically, the system 100 may operate until the fuel-to-air ratio of the ullage in the fuel tank 500 falls significantly below the combustion threshold fuel-to-air ratio at the fuel-tank's pressure. The fuel tank 500 flammability may be reduced as the ullage fuel-to-air ratios reduce and the ullage becomes inert when the fuel-to-air ratio falls below the combustion threshold fuel-to-air ratio.

In one embodiment, the system 100 may use the correlation between $T_{ULLAGE}$ 78 and its saturation fuel-to-air ratio for monitoring the ullage flammability and for system control. The fuel tank ullage may be cooled to design temperature thresholds $X_{SO}$, representing the temperature for stopping the cooling system 400, which may be a function of $P_{FUEL}$ 76. The threshold $X_{SO}$ may ensure that the ullage saturated fuel-to-air ratio is less than the combustion threshold. For example, the combustion threshold fuel-to-air ratio for Jet A fuel may be 0.03 for fuel tanks 500 at altitudes from sea level to 45,000 feet.

This 0.03 fuel-to-air ratio may occur in fuel vapor saturated ullage at temperatures of approximately 102° F. at sea level linearly reducing to approximately 58° F. at 35,000 feet altitude. In one embodiment, ullage temperatures $T_{SAFE}$ may be selected corresponding to a saturated fuel-to-air ratio of 0.02 indicating that the fuel tank 500 is inert to provide a desired "factor of safety". This would correspond to ullage temperatures of approximately 85° F. at sea level and 45° F. at 35,000 feet. The corresponding ullage temperature for a flammable indication 204 may then be greater than $T_{SAFE}$.

In one embodiment, the system 100 may cool the ullage to temperatures $X_{SO}$ at all altitudes, which may be lower than $T_{SAFE}$. When the ullage temperature is less than $X_{SO}$ the system 100 may shut off the cooling system 400 in response to signal 36 provided by the controller 300. The system 100 may automatically restart the cooling system 400 when the ullage temperature exceeds temperatures $X_{OP}$ that may be greater than $X_{SO}$ and less than $T_{SAFE}$. $X_{OP}$ may represent the temperature for starting the cooling system 400 in response to the signal 38 provided by the controller 300. Typically, the system 100 may maintain the fuel tank ullage below $T_{SAFE}$ and below a fuel-to-air ratio of 0.02.

The system 100 may generate cold air to cool the ullage mixture flowing through the heat exchanger of the cooling system 400. This cold air may be generated using thermodynamic processes. These processes may include compression, heat transfer and expansion. Electric power may be used for the compression process and the power generated by an air turbine during the expansion process may be used by ancillary equipment to move cooling air and the ullage mixture through heat exchangers within the cooling system 400.

Numerous advantages may be offered by the system 100 described herein. The system 100 may remove the use of nitrogen enriched air (NEA) and overboard discharge of oxygen depleted air (ODA). Particulate contamination, humidity and gaseous contamination of air and its ozone content may have no effect on system performance. Scheduled maintenance and a higher level of safety may be implemented at very low costs. The system 100 may be simple, reliable, low cost and lower in weight. Furthermore, the system 100 may not require significant modifications of other on-board systems. The system 100 may be analytically simulated with high accuracy. Cold outside air at higher altitudes may enhance system performance such that the system duty cycle may be short. Many additional advantages of the present disclosure will become apparent to those skilled in the relevant art as provided for in the following description.

Figure 2:
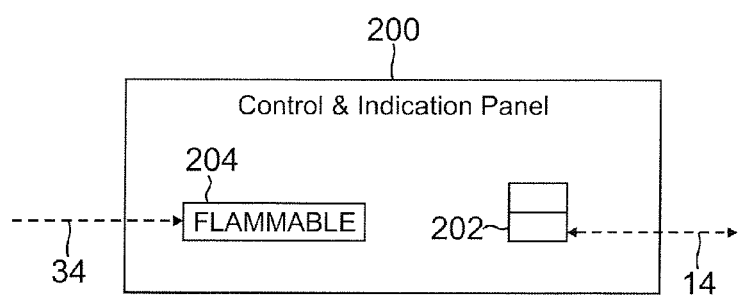
FIG. 2 is an illustrative control and indication panel of the exemplary system provided in FIG. 1.

Turning now to FIG. 2, an illustrative control and indication panel 200 of the exemplary system 100 provided in FIG. 1 may be provided. The control and indication panel 200 may be placed in the cockpit of an aircraft or other area that may allow a user to easily start and stop the system 100. The control and indication panel 200 may include a manual switch 202 for system selection. The switch 202 in the "On" position may provide a signal 14 to the system controller 300 to manage the operation of the cooling system 400. A return signal 14 may be provided to the control and indication panel 200 that may indicate (indicator not shown) that the system has been successfully initiated. In one embodiment, the system operation may be automatic.

The control and indication panel 200 may receive an indicator instruction 34 from the controller 300 when the fuel tank ullage mixture temperature $T_{ULLAGE}$ is greater than the warning temperature threshold $T_{SAFE}$ thus indicating that the ullage mixture flammability level is greater than designed. The indicator instruction 34 may be used to advise, caution or warn. In one embodiment, the indicator instruction 34 may illuminate an advisory indicator "FLAMMABLE" 204. Audio alerts may also be provided in addition to the indicator 204. The control and indication panel 200 may include other indicators, for example, fuel temperature and ullage temperature, if desired.

Figure 3:
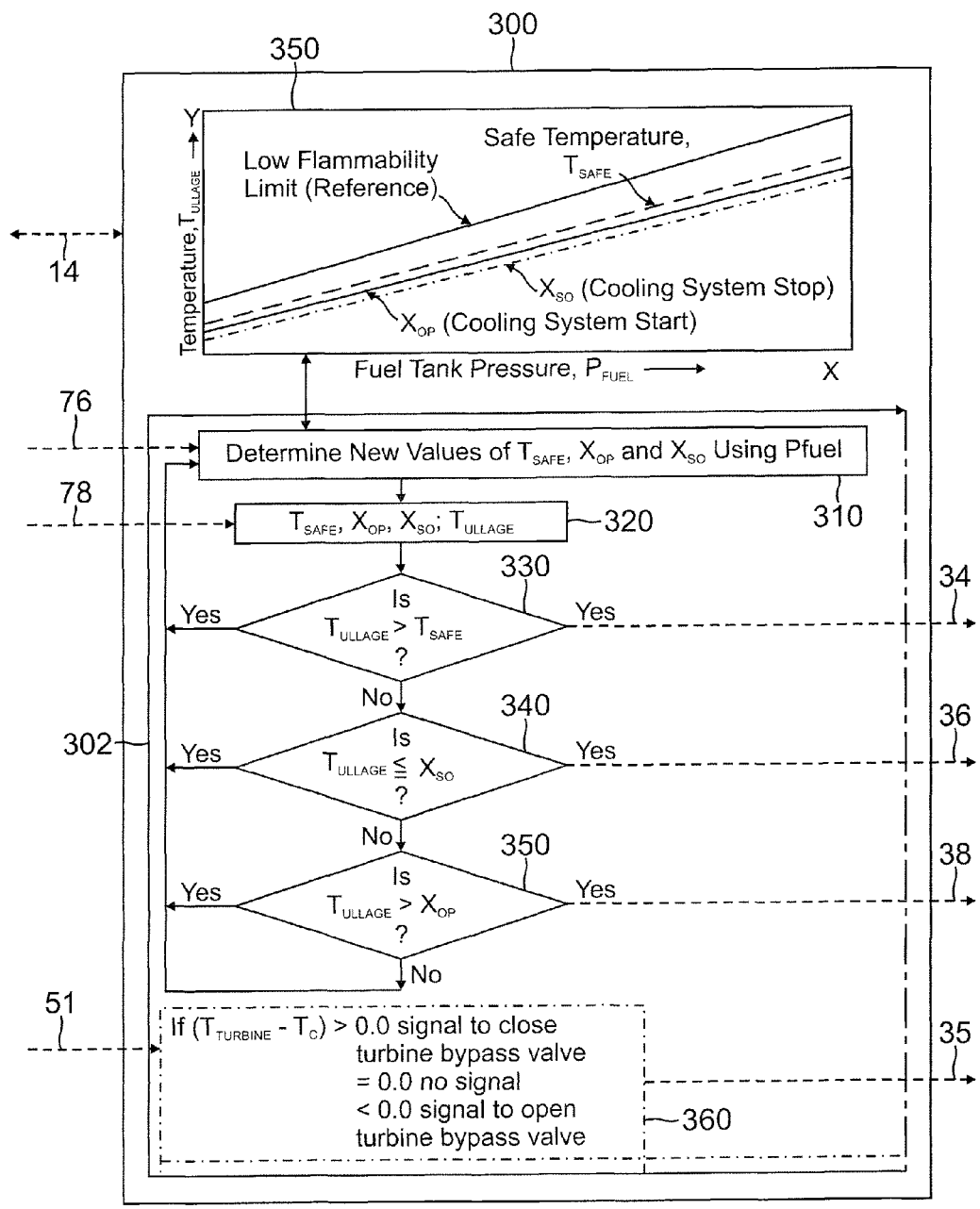
FIG. 3 is the logic of an illustrative controller of the exemplary system provided in FIG. 1.

With reference now to FIG. 3, an illustrative controller 300 of the exemplary system 100 provided in FIG. 1 may be shown. The controller 300 may be coupled to the control and indication panel 200, cooling system 400 and fuel tank 500. The controller 300 may be implemented in software, hardware or combination thereof. The components may also be connected through a network.

Typically, the controller 300 may include at least one processor and instructions 302 for execution by the processor. The data structures and code within the software in which the present disclosure may be implemented, may typically be stored on a non-transitory computer-readable storage. The storage may be any device or medium that may store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the disclosure may be embodied as code and/or data, which may be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described may be included in hardware modules. For example, the hardware modules may include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The technology described herein may be implemented as logical operations and/or modules. The logical operations may be implemented as a sequence of processor-implemented executed steps (or blocks) and as interconnected machine or circuit modules. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiment of the technology described herein are referred to variously as operations, steps, objects, or modules. It should be understood that logical operations may be performed in any order, unless explicitly claimed otherwise or a specific order is inherently necessitated by the claim language.

The controller 300 may include communication ports to connect with the other components of the system 100. The controller 300, through the processor and instructions 302 as well as the communication ports, may continuously receive data from the fuel tank pressure sensor and ullage temperature sensor. In one embodiment, data may be received from an ambient pressure signal from an aircraft data system for a fuel tank vented to outside ambient. A cooling system turbine discharge temperature from the cooling system turbine bypass valve may also be received.

The controller 300 may be used to handle the logic with respect to turning "On" and "Off" the cooling subsystem 400 of system 100. With reference now to block 310 of FIG. 3, the controller 300 may determine new values of $T_{SAFE}$, $X_{OP}$ and $X_{SO}$ using $P_{FUEL}$ 76. $T_{SAFE}$ may be lower than the low flammability limit shown as a reference to provide a desired "factor of safety". $X_{SO}$ may be a designed temperature threshold for the cooling system 400 to stop and $X_{OP}$ may be greater than $X_{SO}$ and less than $T_{SAFE}$ and represent a temperature for the cooling system 400 to start.

To determine these values, a representative graph 350 may be shown. This graph 350 may show a combustion threshold in the form of a low flammability limit (reference). The ullage temperature $T_{ULLAGE}$ may be positioned on the Y-axis and the fuel tank pressure $P_{FUEL}$ may be placed along the X-axis. Combinations of $T_{ULLAGE}$ and $P_{FUEL}$ above the low flammability limit may result in combustion within the fuel tank 500.

$T_{SAFE}$ may be set below the low flammability limit as indicated within the graph 350. Generally, $T_{SAFE}$ may be set well below the flammability limit. $X_{OP}$ may be placed below $T_{SAFE}$ representing the temperature for starting the cooling system 400. $X_{SO}$, representing the temperature to stop the cooling system 400, may be placed to indicate a temperature less than $X_{OP}$. As shown in block 310, the controller 300 may determine values automatically through the graphical representative above. The controller 300 may continuously determine $T_{SAFE}$, $X_{SO}$ and $X_{OP}$.

In one embodiment, a table lookup using $P_{FUEL}$ 76 to determine $T_{SAFE}$, $X_{SO}$, and $X_{OP}$ from data stored in the memory of the controller 300 may be used. The table look up method may store data represented in graph 350. Alternatively, algorithms may be used and implemented in software and hardware to determine those values.

The ullage temperature $T_{ULLAGE}$ may be provided at block 320. $T_{SAFE}$, $X_{SO}$, $X_{OP}$ and $T_{ULLAGE}$ may then be used to determine signals provided by the controller 300 to components within the system 100. At block 330, the controller 300 may determine whether the ullage temperature $T_{ULLAGE}$ from the fuel tank 500 may be greater than the safety temperature limit $T_{SAFE}$ defined earlier. When $T_{ULLAGE}$ is greater than $T_{SAFE}$, a signal to indicator instruction 34 may be provided from the controller 300 to the control and indication panel 200 of FIG. 2. This condition may indicate that the fuel flammability is greater than desired. At the control and indication panel 200, the user of the system 100 may be alerted of a potentially dangerous condition through audio or visual modes. The signal or instruction 34 may illuminate indicator 204. In one embodiment, the actions of the cooling system 400 may be automatically implemented.

At block 340, and when the first condition is not met, the processor and instructions 302 may compare $T_{ULLAGE}$ with $X_{SO}$. Recall that $T_{ULLAGE}$ may represent the temperature of the ullage within the fuel tank 500, while $X_{SO}$ may represent the temperature for stopping the cooling system 400. A stop cooling system instruction 36 may be provided to the cooling system 400. The instruction 36 may be generated when $T_{ULLAGE}$ is equal to or less than $X_{SO}$, that is, $T_{ULLAGE} \leq X_{SO}$. The condition may signify that the fuel tank ullage flammability (or fuel-to-air ratio) may be equal to or less than desired value $X_{SO}$ and further cooling of the ullage may not be necessary. Control may be provided back to block 310 when $T_{ULLAGE}$ is equal to or less than $X_{SO}$. In one embodiment, $T_{ULLAGE} < X_{SO}$ may be used.

At block 350, and when the second condition was not met, $T_{ULLAGE}$ may be compared with $X_{OP}$. $T_{ULLAGE}$ may represent the temperature of the ullage within the fuel tank 500, while $X_{OP}$ may represent the temperature for starting the cooling system 400. A start cooling system instruction 38 may be provided to the cooling system 400 when $T_{ULLAGE}$ may be greater than $X_{OP}$, that is, $T_{ULLAGE} > X_{OP}$. The condition may signify that the fuel tank ullage flammability (or fuel-to-air ratio) may be greater than a desired value and cooling of the ullage may be implemented. In one embodiment, $T_{ULLAGE} \geq X_{OP}$ may be used. Control may be provided back to block 310.

Figure 4:
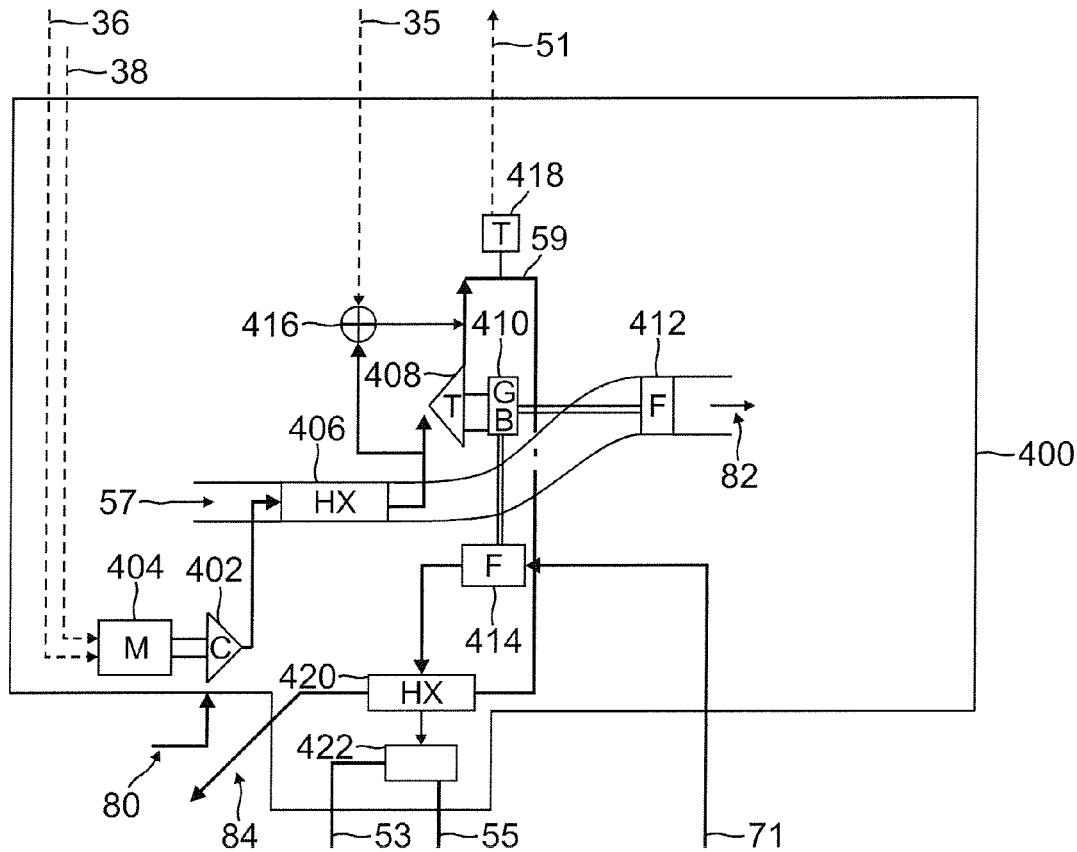
FIG. 4 is an illustrative cooling system of the exemplary system provided in FIG. 1.

At block 360, the temperature of the turbine, $T_{TURBINE}$ 51, may be compared with a temperature threshold in a turbine discharge conduit, $T_C$, stored in the controller 300. $T_C$ may be above the freezing temperature of air, 32° F. $T_{TURBINE}$ 51 may be received from the cooling system temperature sensor located in a turbine discharge conduit, which is shown in FIG. 4. When $T_{TURBINE}$ 51 less the programmed temperature threshold $T_C$ ($T_{TURBINE} - T_C$) is greater than 0.0, a signal to close the turbine bypass valve instruction 35 may be provided from the controller 300 to the cooling system 400. When equal to 0.0, no instruction 35 may be provided. When it is less than to 0.0, the instruction 35 may signal to the cooling system 400 to open the turbine bypass valve. Variations of the comparison may be used and is not limited to those described above.

In addition to the turbine bypass valve instruction 35, a turbine bypass valve modulation signal may be used. While being primarily described as being implemented by the processor and instructions 302, other variations may be incorporated or used. For example a microprocessor may be used with the instructions. Multiple processors may also be used and tasks may be divided accordingly to a multi-process system.

Referring to FIG. 4, an illustrative cooling system 400 of the exemplary system 100 provided in FIG. 1 may be shown. The cooling system 400 may be coupled to the controller 300 and the fuel tank 500. The cooling system 400 may be coupled to the fuel tank 500 through a liquid fuel conduit 55, a cold ullage mixture conduit 53 and an ullage mixture withdrawal conduit 71. The cooling system 400 may operate when commanded by instruction 38 from the controller 300. The cooling system 400 may stop when commanded by the controller 300 through instruction 36. A signal to turbine bypass valve instruction 35 may be provided from the controller 300 and more specifically to the turbine bypass valve 416.

The cooling system 400 may include, but is not limited to, an air compressor 402, electric motor with controllers 404, air-to-air heat exchanger 406, turbine 408, gear box 410 driving cooling fan 412 and an ullage mixture fan 414 that is connected to the ullage mixture withdrawal conduit 71, turbine bypass valve 416 and turbine discharge temperature sensor 418 providing instruction 51 to controller 300. Other system 400 components may include an ullage mixture/air heat exchanger 420 and fuel mist separator 422. The fuel mist separator 422 may be coupled to the liquid fuel conduit 55 and cold mixture conduit 53.

The cooling system 400 may receive cooling air 57. Cooling air exhaust 82 may be expelled by the fan 412. In one embodiment, the system 400 may receive ambient air 80. Cooling air exhaust 84 may be expelled by the ullage mixture/air heat exchanger 420 as well. The features of the cooling system 400 will become apparent from the discussion provided below.

In operation, the electric motor 404 may begin the cooling process. The motor 404 may come in a variety of shapes and forms and run on electrical power. The motor 404 may power the compressor 402. The ambient air 80 may be drawn or sucked in by the compressor 402 and compressed to a high pressure and temperature. The compressor 402 may deliver this high pressure and temperature air to the air-to-air heat exchanger 406.

The heat exchanger 406 may cool the ambient air 80 to a lower temperature by heat transfer. To do this, cooling air 57 may be drawn through the heat exchanger 406 by the cooling fan 412. High pressure and moderate temperature air exhausting from the air-to-air heat exchanger 406 may next flow to the turbine 408 and to the turbine bypass valve 416. The turbine bypass valve 416 may be manipulated by instruction 51 received from the controller 300. The turbine 408 may extract energy from the air flowing through it and input the energy into gearbox 410.

Air flowing through the turbine 408 may expand and decrease in pressure and temperature. Temperature sensor 418, located downstream of the turbine 408 in discharge duct 59 may sense the temperature and send the temperature data, $T_{TURBINE}$ 51 to the controller 300 where it is compared to the threshold turbine discharge temperature $T_C$. $T_C$ may be programmed in the processor and instructions 302.

The controller 300 may generate a turbine bypass valve instruction 35, as shown in FIG. 3, that modulates the turbine bypass valve 416 to minimize the error ($T_{TURBINE}-T_C$). During conditions when the turbine bypass valve 416 is not closed, a portion of the moderate temperature air may bypass the turbine 408 to mix with the cold turbine discharge air to raise its temperature in conduit 59.

A cooling fan 412 may obtain power for its operation from the gear box 410. The gear box 410, as shown, may be coupled to the turbine 408, which may input power to the gear box 410. In essence, the above configuration may generate cold air used to cool the ullage mixture withdrawn by the fan 414 from the fuel tank 500 via the conduit 71.

Figure 5:
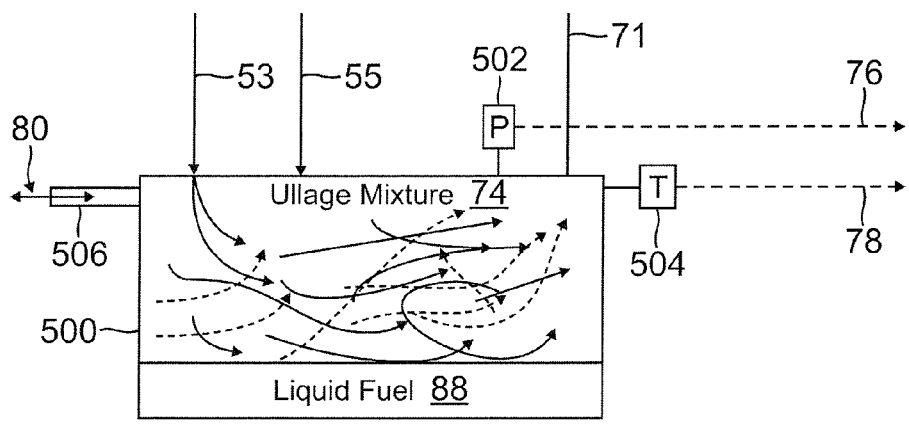
FIG. 5 is an illustrative fuel tank of the exemplary system provided in FIG. 1.

Referring to FIG. 5, an illustrative fuel tank 500 of the exemplary system 100 provided in FIG. 1 may be shown. The cooling system 400 may be connected to the fuel tank 500. The ullage mixture withdrawal conduit 71 along with the liquid fuel conduit 55 and cold mixture conduit 53 may couple the two components together.

The fuel tank 500 may include liquid fuel 88 and ullage mixture 74. Typically, the ullage mixture 74 may consist of fuel vapors and air. The fuel tank 500 may be vented to outside ambient air 80 by a vent 506. The vented fuel tank 500 may be essentially at outside ambient pressure.

Connected to the fuel tank 500 may be a pressure sensor 502 and a temperature sensor 504. Pressure data from the aircraft air data system may be used instead of pressure sensor 502 for a vented fuel tank 500. In one embodiment, an algorithm to determine fuel tank pressures may use ambient pressures in place of the fuel tank 500 pressure sensor 502 when the fuel tank 500 is pressurized. The fuel tank pressure signal 502 may be continuously used by the controller 300 to generate instructions 34, 36 and 38 as shown in FIGS. 3 and 4.

Returning to FIG. 4, an ullage mixture fan 414 and cooling fan 412 may obtain power from the gearbox 410 of the cooling system 400. The turbine 408 of the cooling system 400 may use compressed air delivered by the electric motor 404 driven compressor 402 to input power in the gearbox 410. Hence, power input to the gearbox 410 may be provided when the electric motor 404 is operating. The ullage mixture fan 414 and the cooling fan 412 may operate when the electric motor 404 is used. The electric motor 404 may operate until commanded to stop operating by instruction 36 generated by the controller 300.

In one embodiment, the ullage mixture fan 414 may withdraw some of the ullage mixture 74 from the fuel tank ullage 500 via conduit 71. The fan 414 may supply ullage mixture 74 to the ullage mixture/air heat exchanger 420 where the ullage mixture 74 is cooled by the cold air supplied by turbine 408.

Continuing with FIGS. 4 and 5, when cooling the ullage mixture 74, some of the fuel vapors present in the ullage mixture may condense out producing liquid fuel droplets (fuel mist). Liquid fuel droplets may be removed from the cold ullage mixture 74 exhausting out of the heat exchanger 420 by a fuel mist separator 422. In one embodiment, conduit 55 returns condensed liquid fuel 88 to the fuel tank and conduit 53 returns cold ullage mixture to the fuel tank ullage 74. The fuel 88 in the fuel tank 500 may reduce as fuel is consumed and the ullage may increase in volume. The total volume of the ullage mixture 74 and liquid fuel 88 is the volume of the fuel tank 500. This ullage mixture 74 cooling may continue in the heat exchanger 420 until the cooling system 400 stops operating on command 36 from the controller 300.

Cooling air from the heat exchangers 406 and 420 may be discharged using appropriate discharge outlets, not shown. FIG. 4 shows a gearbox 410 to drive the cooling fan 412 and ullage mixture fan 414. Other methods may be used to drive the two fans, for example, both fans on a common shaft that have the turbine 408 mounted on it using a three wheel machine. In another embodiment the turbine 408 may drive the cooling fan 412 without the gear box 410 and an electric motor (not shown) may drive the fan 414. The electric motor (not shown) may operate when the cooling system operates.

Apparent from the disclosure provided above, the cooling system 400 may reduce the temperature of the ullage mixture 74 in the fuel tank 500. By reducing the temperature, the fuel-to-air ratio and hence its flammability may also be lowered. This may make the ullage mixture 74 inert by reducing the ullage mixture fuel-to-air ratio below the combustion threshold.

Many changes or enhancements may be made to the system 400 described above. For example, grounding straps may be added to reduce the potential of fire due to static electricity. Flame arrestors may be installed to arrest flame propagation in the event of a fire. Built in test equipment may be added to detect failure of components. Addition of such changes or enhancements may be made without departing from the disclosure.

Figure 6:
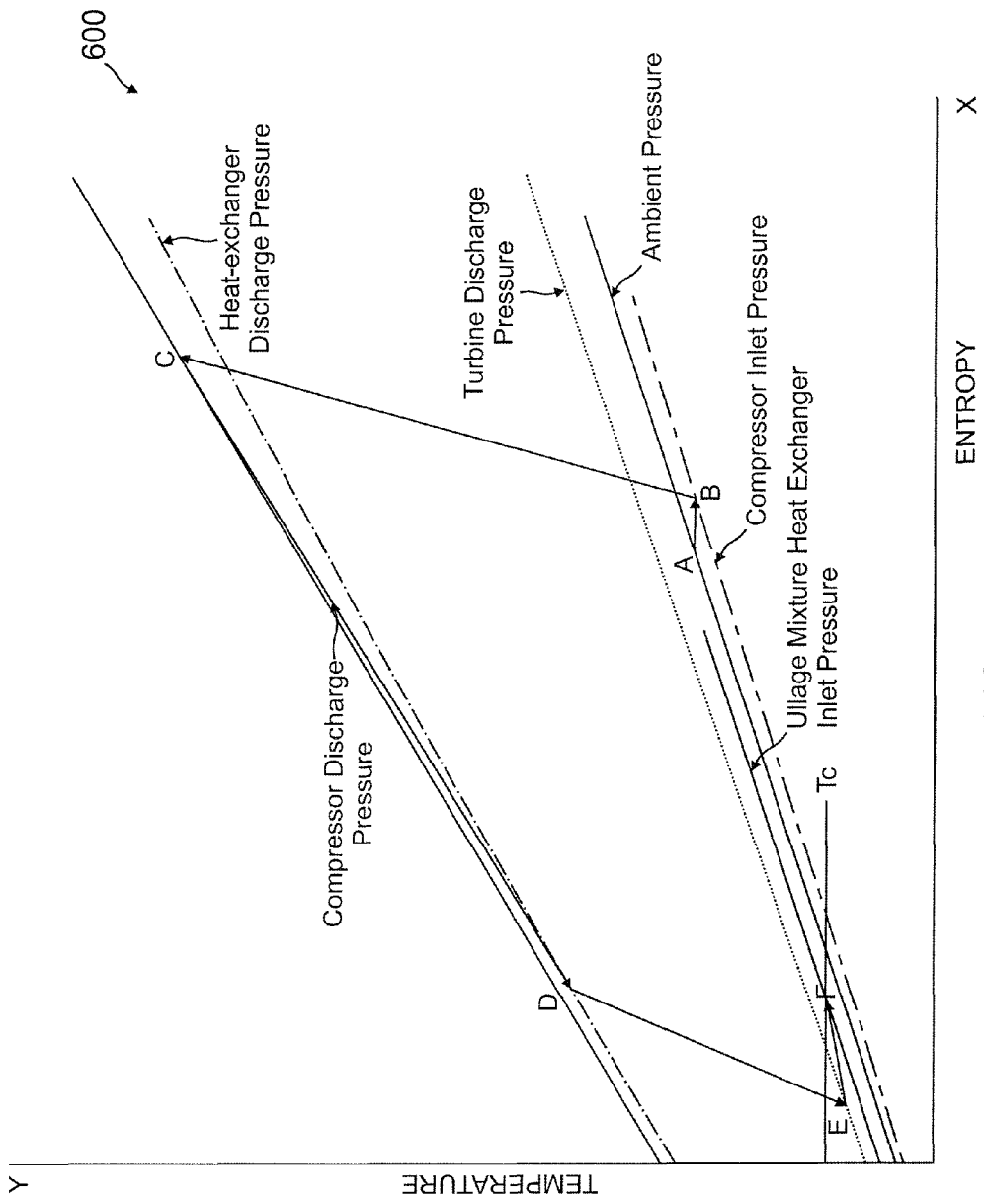
FIG. 6 is a process diagram showing operation of the illustrative cooling system of FIG. 4.

Turning to FIG. 6, a graph 600 showing operation of the illustrative cooling system 400 of FIG. 4 may be shown. Temperatures may be provided along the Y-axis while entropy may be detailed along the X-axis. Point A may represent a condition of ambient air 80. Line AB may detail air suction by the compressor 402. Line BC may show air compression by the compressor 402. The temperature may increase significantly during compression process, as shown.

Line CD may represent air cooling in the heat exchanger 406. The temperature drops during this process. Line DE may show air expansion within the turbine 408, while line EF may depict bypass air from bypass valve 416 mixing with turbine exhaust. Point F may show conditioned cold air at a low temperature supplied to the ullage mixture heat exchanger 420.

Figure 7:
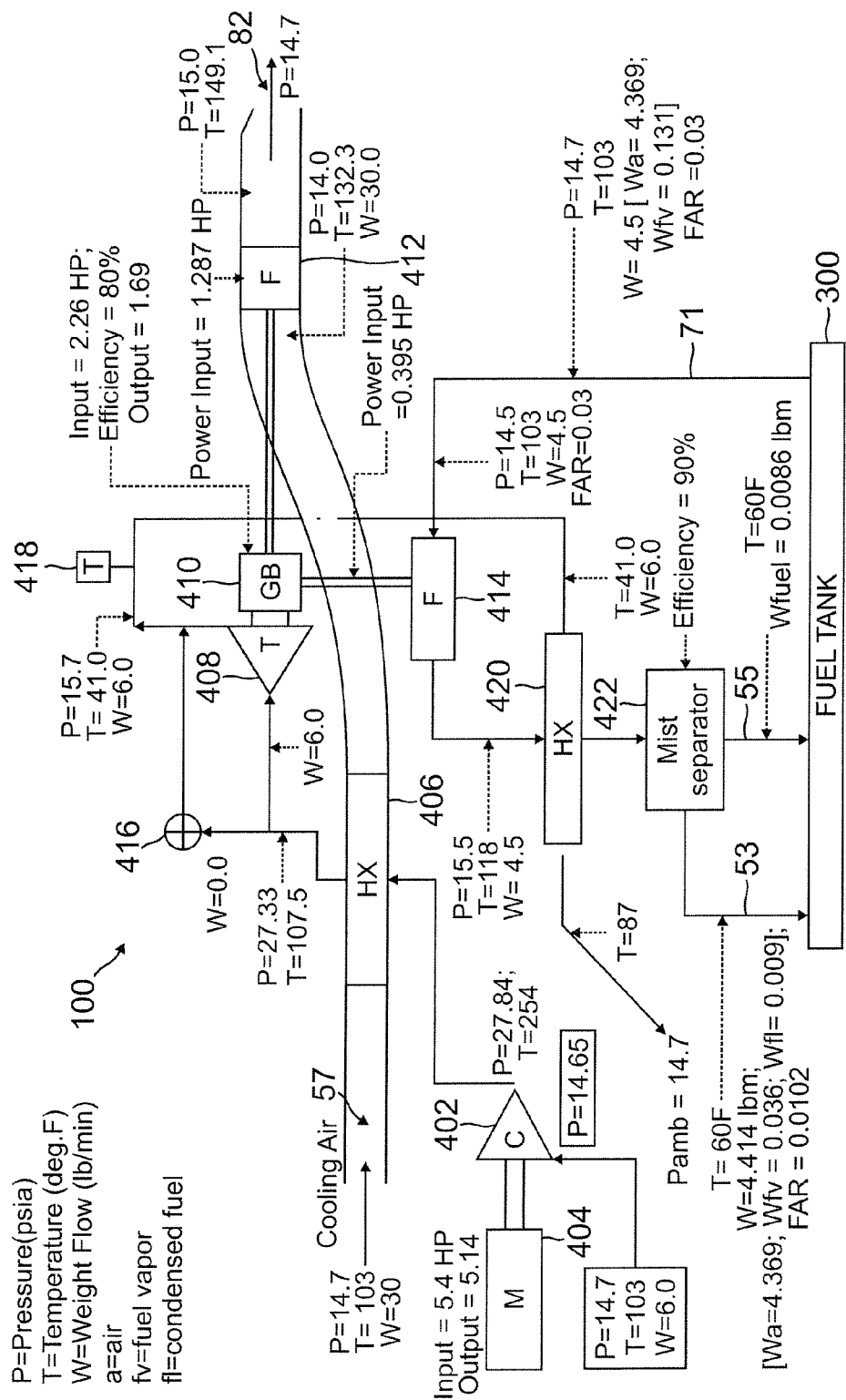
FIG. 7 is the exemplary system provided in FIG. 1 depicting estimated performance.

Referring to FIG. 7, the exemplary system 100 provided in FIG. 1 depicting estimated performance may be shown. The performance shows the potential of cooling the ullage mixture 74. The analysis may be provided for sea level conditions on a hot-day. Assumptions and component characteristics are indicated.

The system 100 may use an electric motor 404 driven compressor 402 having a 1.9 pressure ratio. The electric motor 404 may be approximately 5.4 HP. The system 100 may withdraw approximately 60 cfm (4.5 ibm) of ullage mixture 74 saturated with fuel vapor (fuel-to-air ratio of 0.03 that is potentially flammable). The system 100 may cool the withdrawn ullage mixture 74 to 60° F. In this process, the system 100 may remove 0.08 lb/min of fuel 88 from the withdrawn ullage mixture 74 and reduce the mixture's fuel-to-air ratio to 0.0102 thus making the mixture 74 inert. The system 100 may use state of the art components. FIG. 7 may show the physical conditions of air and ullage mixture 74 at selected locations.

In one embodiment, the system 100 may be able to reduce the fuel-to-air ratio of ullage mixture 74 from an initial 0.03 to 0.01 in approximately 12 minutes in a 600 cubic feet volume thermally insulated fuel tank 500. Generally, the system 100 may take longer when the fuel tank 500 is exposed to heat sources. The time may be shortened by reducing the turbine discharge temperature by increasing the compressor pressure ratio and/or increasing the compressor air flow. The system 100 may provide design flexibility.

While embodiments of the disclosure have been described in terms of various specific embodiments, those skilled in the art will recognize that the embodiments of the disclosure may be practiced with modifications within the spirit and scope of the claims.

What is claimed is:

1. A system for reducing flammability comprising:
a heat exchanger that cools ullage from a tank, condenses vapors within the ullage, and returns the cooled ullage and vapors to the tank; and
a turbine for receiving high pressure and moderate temperature air exhausting from the heat exchanger, wherein the turbine extracts energy from the air and inputs the energy into a gear box.

2. The system for reducing flammability of claim 1, further comprising a switch for managing operations of the system.

3. The system for reducing flammability of claim 1, further comprising a controller for activating and deactivating the system.

4. The system for reducing flammability of claim 1, further comprising a tank pressure sensor and ullage temperature sensor.

5. The system for reducing flammability of claim 1, further comprising a compressor that provides compressed air to the heat exchanger.

6. The system for reducing flammability of claim 5, further comprising a motor coupled to the compressor for powering the compressor.

7. The system for reducing flammability of claim 5, further comprising a cooling fan for drawing cold air through the heat exchanger.

8. The system for reducing flammability of claim 1, further comprising a turbine bypass valve which, when opened, a portion of moderate temperature air bypasses the turbine to mix with cold turbine discharge air.

9. The system for reducing flammability of claim 1, further comprising a cooling fan obtaining power through the gear box to which the turbine provides power, the gear box driving the cooling fan and an ullage mixture fan.

10. A fuel inerting system comprising:
a heat exchanger;
a turbine for receiving high pressure and moderate temperature air exhausting from the heat exchanger, wherein the turbine extracts energy from the air and inputs the energy into a gear box;
at least one processor; and
a memory operatively coupled to the processor, the memory storing program instructions that when executed by the processor, causes the processor to:
determine a fuel-to-air ratio within a tank;
cool ullage within the tank through the heat exchanger when the fuel-to-air ratio is above a predetermined threshold.

11. The inerting system of claim 10, wherein the predetermined threshold is below a point at which the ullage is considered flammable.

12. The inerting system of claim 10, further comprising a controller for generating signals to determine the fuel-to-air ratio and cool the ullage.

13. The inerting system of claim 10, further comprising a fuel mist separator for removing fuel droplets from the cooled ullage.

14. A method for reducing tank flammability comprising:
removing ullage from a tank;
cooling the ullage for condensing vapors within the ullage by a heat exchanger;
returning the cooled ullage and vapors to the tank by the heat exchanger; and
receiving high pressure and moderate temperature air exhausting from the heat exchanger by a turbine, the turbine extracting energy from the air and inputs the energy into a gear box.

15. The method for reducing tank flammability of claim 14, further comprising stopping removal of the ullage from the tank when a temperature of the ullage is less than a threshold.

16. The method for reducing tank flammability of claim 15, further comprising restarting removal of the ullage from the tank when the temperature exceeds the threshold.

17. The method for reducing tank flammability of claim 14, further comprising monitoring flammability of the ullage by correlating a temperature of the ullage within the tank and a fuel-to-air ratio.

18. The method for reducing tank flammability of claim 17, further comprising cooling the ullage until the fuel-to-air ratio falls below a combustion threshold within the tank.

19. The method for reducing tank flammability of claim 14, wherein removing the ullage from the tank comprises directing the ullage to a heat exchanger and cooling the ullage within the heat exchanger through cold air.

* * * * *